(12) United States Patent
Ramaswami et al.

(10) Patent No.: US 9,898,383 B2
(45) Date of Patent: Feb. 20, 2018

(54) TECHNIQUES AND MECHANISMS FOR MANAGING AND ANALYZING DATABASE QUERY ACTIVITIES

(71) Applicant: salesforce.com, inc., San Francisco, CA (US)

(72) Inventors: Satish Ramaswami, Santa Clara, CA (US); Prashant Srinivasan, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 556 days.

(21) Appl. No.: 14/511,097

(22) Filed: Oct. 9, 2014

(65) Prior Publication Data
US 2015/0100566 A1    Apr. 9, 2015

Related U.S. Application Data

(60) Provisional application No. 61/888,966, filed on Oct. 9, 2013.

(51) Int. Cl.
*G06F 17/30* (2006.01)
*G06F 11/34* (2006.01)

(52) U.S. Cl.
CPC ...... *G06F 11/3409* (2013.01); *G06F 11/3452* (2013.01); *G06F 17/30306* (2013.01); *G06F 17/30463* (2013.01); *G06F 2201/80* (2013.01)

(58) Field of Classification Search
CPC ............. G06F 17/30306; G06F 17/30463
USPC ............................................. 707/718
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |

(Continued)

*Primary Examiner* — Mark E Hershley
(74) *Attorney, Agent, or Firm* — Alpine Technology Law Group LLC

(57) ABSTRACT

Techniques and mechanisms for analyzing a plurality of database queries within a database environment. A first statistical evaluation of a first query plan is determined for a first database query with at least one computing device within the database environment. A second statistical evaluation for a second query plan is determined for a second database query. The first statistical evaluation and the second statistical evaluation are compared to determine whether the first query plan matches the second query plan with at least one computing device within the database environment. An indication is stored in a repository of the database environment that the first query matches the second query if the first hash value matches the second hash value. A function that provides the first query plan is determined. If the second query plan is provided by the function that provides the first query plan, data objects referenced by the first query plan and the second query plan if the function provides both the first query plan and the second query plan to determine if the first query plan and the second query plan are syntactically different versions of equivalent database queries. Query statistics are stored in the statistical repository if the first query plan and the second query plan are syntactically different versions of equivalent database queries.

21 Claims, 6 Drawing Sheets

(56) References Cited

U.S. PATENT DOCUMENTS

| | | |
|---|---|---|
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,131 B1 * | 8/2003 | Zait ................. G06F 9/5066 |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,702,610 B2 * | 4/2010 | Zane ................. G06F 17/30421 707/999.001 |
| 8,682,875 B2 * | 3/2014 | Barsness ........... G06F 17/30442 707/702 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2002/0194157 A1 * | 12/2002 | Zait ..................... G06F 17/3033 |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2011/0029508 A1 * | 2/2011 | Al-Omari ......... G06F 17/30433 707/718 |
| 2012/0191698 A1 * | 7/2012 | Albrecht ........... G06F 17/30442 707/718 |
| 2012/0197866 A1 * | 8/2012 | Xu ..................... G06F 17/30412 707/713 |
| 2014/0207740 A1 * | 7/2014 | Narasayya ........ G06F 17/30501 707/688 |

* cited by examiner

| Activity | GA Data | GA+1 Data | Difference | % Inc_Dec Diff |
|---|---|---|---|---|
| Redo size: | 3615815.22 | 3614216.43 | -1598.79 | -0.04 |
| Logical reads: | 50139.35 | 54644.08 | 4504.73 | 8.98 |
| Block changes: | 23346.69 | 23371.60 | 24.91 | 0.11 |
| Physical reads: | 3.09 | 11.28 | 8.19 | 265.05 |
| Physical writes: | 341.81 | 341.18 | -0.63 | -0.18 |
| User calls: | 14.83 | 15.67 | 0.84 | 5.66 |
| Parses: | 9.09 | 9.44 | 0.35 | 3.85 |
| Hard parses: | 0.25 | 0.23 | -0.02 | -8.00 |
| Sorts: | 4.38 | 4.31 | -0.07 | -1.60 |
| Logons: | 0.03 | 0.04 | 0.01 | 33.33 |
| Executes: | 59.52 | 60.26 | 0.74 | 1.24 |
| Transactions: | 34.46 | 34.79 | 0.33 | 0.96 |

| SQL TEXT GA | SQL TEXT GA+1 |
|---|---|
| DELETE /*sSharingRuleConAccBlowNew.sql:maybe_reduce_acc_rule_lvl:168*/ FROM sales.con_share /* SHARING: rule DML - maybe_reduce_acc_rule_lvl */ WHERE organization_id = :b3 AND row_cause = :b2 AND ug_id = :b1 AND contact_id IN ( SELECT /* + ORDERED USE_NL(dgm a c) */ c.contact_id FROM core.group_blowout gb, core.direct_group_member dgm, sales.account a, sales.contact c WHERE gb.organization_id = :b3 AND dgm.organization_id = :b3 AND a.organization_id = :b3 AND c.organization_id = :b3 -- Start with the source group and its accounts AND :b4 = gb.ug_id AND gb.component_ug_id = dgm.ug_id AND gb.is_transitive = '0' AND gb.suppress_rules = '0' AND dgm.suppress_rules = '0' AND dgm.member_id = a.owner -- Find cons for the accounts AND a.account_id = c.account_id AND a.account_id NOT IN (-- There is no longer any account sharing row that causes this implicit row SELECT /* + HASH_AJ ORDERED USE_NL(dgm2 a1 s1) */ a1.account_id FROM core.group_blowout gb2, core.direct_group_member dgm2, sales.account a1, sales.acc_share s1 WHERE s1.organization_id = :b3 AND a1.organization_id = :b3 AND gb2.organization_id = :b3 AND d gm2.organization_id = :b3 -- Start with the source group and its accounts AND :b4 = gb2.ug_id AND gb2.component_ug_id = dgm2.ug_id AND gb2.is_transitive = '0' AND dgm2.member_id = a1.owner -- Find sharing row these accounts to the target group AND s1.account_id = a1.account_id AND s1.ug_id = :b1 And s1.com_access_level > :b5 )) | DELETE /*sSharingRuleConAccBlowNew.sql:maybe_reduce_acc_rule_lvl:183*/ FROM sales.con_share /* SHARING: rule DML - maybe_reduce_acc_rule_lvl */ WHERE organization_id = :b3 AND row_cause = :b2 AND ug_id = :b1 AND contact_id IN ( SELECT /* + ORDERED USE_NL(a c) */ c.contact_id FROM core.tmpp_id_list tmp, sales.account a, sales.contact c WHERE gb.organization_id = :b3 AND c.organization_id = :b3 AND tmp.entity_id = a.owner -- Find cons for the accounts AND a.account_id = c.account_id AND a.account_id NOT IN (-- There is no longer any account sharing row that causes this implicit row SELECT /* + HASH_AJ ORDERED USE_NL(a1 s1) */ a1.account_id FROM core.tmpp_id_list tmp2, sales.account a1, sales.acc_share s1 WHERE s1.organization_id = :b3 AND a1.organization_id = :b3 AND tmp2.entity_id = a1.owner -- Find sharing row these accounts to the target group AND s1.account_id = a1.account_id AND s1.ug_id = :b1 AND s1.con_access_level > :b4 )) |

| SQL TEXT Diff | GA Buffer Gets / Exec | GA+1 Buffer Gets / Exec | SQL by Gets / Execution Difference | % Inc_Dec Diff |
|---|---|---|---|---|
| DELETE /*+sSharingRuleConAccBlowNew.sql:maybe_reduce_acc_rule_lvl: 168*/-183*/ FROM sales.con_share /* SHARING: rule DML - maybe_reduce_acc_rule_lvl */WHERE organization_id = :b3 AND row_cause = :b2 AND ug_id = :b1 AND contact_id IN ( SELECT /* + ORDERED USE_NL( dgm a c) */ c.contact_id FROM core.group_blowout gb, core.direct_group_member dgm, tmpp_id_list tmp, sales.account a, a, sales.contact c WHERE gb.organization_id = :b3 AND dgm.organization_id = :b3 AND a.organization_id = :b3 AND c.organization_id = :b3 -- Start with the source group and its accounts AND gb.ug_id b3 AND gb.component_ug_id = dgm.ug_id AND gb.is_transitive = '0' AND gb.suppress_rules = '0' AND dgm.suppress_rules = '0' AND dgm.member_id= tmp.entity_id = a.owner -- Find cons for the accounts AND a.account_id = c.account_id AND a.account_id NOT IN ( -- There is no longer any account sharing row that causes this implicit row SELECT /* + HASH_AJ ORDERED USE_NL( dgm2 a1 s1) */ /a1.account_id FROM core.group_blowout gb2, core.direct_group_member dgm2, tmpp_id_list tmp2, sales.account a1, a1, sales.acc_share s1 WHERE s1.organization_id = :b3 AND a1.organization_id = :b3 AND gb2.organization_id = :b3 AND d gm2.organization_id = :b3 -- Start with the source group and its accounts AND b4 = gb2.ug_id AND gb2.component_ug_id = dgm2.ug_id AND gb2.is_transitive = '0' AND dgm2.suppress_rules = '0' AND gb2.suppress_rules = '0' AND dgm2.member_id = tmp2.entity_id = a1.owner -- Find sharing row these accounts to the target group AND s1.account_id = a1.account_id AND s1.ug_id = :b1 AND s1.con_accesslevel > :b5 ))b4 ) ) | 14744162.00 | 14746040.00 | 1878.00 | 0.01 |

TECHNIQUES AND MECHANISMS FOR MANAGING AND ANALYZING DATABASE QUERY ACTIVITIES

CLAIM OF PRIORITY

This patent application is related to, and claims priority to, U.S. Provisional Patent Application No. 61/888,966 entitled "Analyzing an Automatic Workload Repository," filed Oct. 9, 2013, the entire contents of which are incorporated herein by reference.

TECHNICAL FIELD

Embodiments relate to techniques for analytics within a database environment. More particularly, embodiments relate to techniques and mechanisms for analyzing database query activities and managing associated data.

BACKGROUND

To effectively manage a database environment, various statistics are gathered. Many database platforms generate different types of statistics for systems, sessions, individual Structured Query Language (SQL) statements, etc. These statistics can be used for system management, reporting, diagnostics, etc. One technique for analyzing performance is to determine changes in statistics over time. This requires gather of historical data. However, gathering of these statistics from multiple databases, or even from a single database, can be difficult because different databases or different SQL statements may be slightly different even if having the same functional result. Thus, it can be difficult to get a true picture of these statistics.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 2 is an example of the type of information that can be included in a result file used for managing and analyzing database queries.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Databases have provided many performance gathering and reporting tools over the years. One such tool is an Automatic Workload Repository (AWR) available in ORACLE® databases. An AWR is used by a database system to collect various database statistics. such as wait events used to identify performance problems, time model statistics indicating the amount of DB time associated with a process, a active session history (ASH) statistics, object usage statistics, etc. Normally AWR information is unique to a specific database and database environment. Comparing AWR data from different databases is hard because each database, query, report, etc. has a different SQL ID, query format, different schema, etc. These shortcomings apply to other query statistical information as well.

In one implementation, an intelligent tool bridges the problems described above. In one implementation, the intelligent tool can access and compare AWRs (or other statistical information) from different databases. This is not inherently easy to do, because different databases may have different object types and schemas. To compare AWRs, for example, in one implementation, the tool evaluates input files, maps SQL IDs to SQL text, maps SQL IDs to difference parameters and uses the SQL text and parameters as comparison input since SQL IDs may not be the same over two distinct databases.

In one embodiment, by analyzing the extra data (e.g., SQL text and other parameters) the tool can determine which queries are like queries in the different database. Once it has done this analysis, in one implementation, the tool creates output files. These output files can be stored in a database, a statistics repository, etc. In one embodiment, the techniques described herein can be applied to all database queries and search plans.

Figure 1:
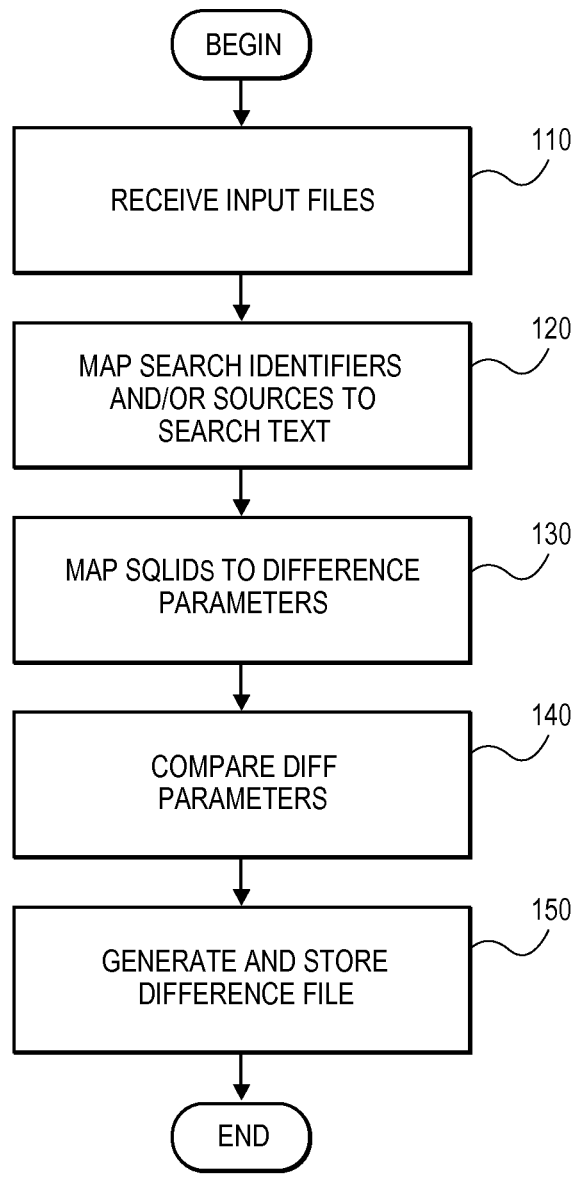
FIG. 1 is a conceptual illustration of one embodiment of a technique and components of a tool to provide analysis for database queries.

FIG. 1 is a conceptual illustration of one embodiment of a technique and components of a tool to provide analysis for database queries. Using the techniques and components described herein, if a particular query changes across a release, for example, the tool will be able to detect this change and provide an accurate analysis. Unlike, for example, simpler diff packages that are unable to relate SQLID changes to SQLTEXT.

Also, the intelligent tool can help avoid needless lookups to the SQLTEXT anchor provided in the statistical reports because it resolves that on its own automatically. In other words, the tool can do head-to-head query comparisons regardless of the difference in software versions. In one implementation, the tool can relate queries to other queries and provide a "diff" of how the query has changes with software updates, query updates, etc. In one implementation, the intelligent tool can be used to compare data in a database when one or more databases are refreshed and the existing snapshots lost.

In one embodiment, two or more input files are received, 110. These files can be, for example, AWR files; however, other file formats (e.g., DB2) can also be supported. The AWR files provide individual SQL statements and cumulative and delta values for various query statistics at all levels except the session level. The delta values represent changes for each statistic over a time period. Some or all of this information can be used by the tool.

Search identifiers and/or sources are mapped to search text, 120. In one embodiment, SQL identifiers (IDs) are mapped to SQL text. In one embodiment, V$SQL can be utilized in the mapping. V$SQL lists statistics on shared SQL area without the GROUP BY clause and contains one row for each child of the original SQL text entered. Statistics displayed in V$SQL are normally updated at the end of query execution. However, for long running queries, they are updated every 5 seconds. This makes it easy to see the impact of long running SQL statements while they are still in progress. V$SQL further includes SQL text and SQL statements for the corresponding queries.

The search identifiers are mapped to difference parameters, 130. The various parameters to be compared are mapped, for example, redo size, logical reads, block changes, physical reads, physical writes, user calls, parses, hard parses, sorts, logons, executes, transactions. In one embodiment, the functions and/or procedure calls from which the queries originate may be utilized to for comparison/analysis purposes. Different and/or additional parameters can also be compared. By utilizing the mapping/conversions described herein, queries for different databases and/or different database versions can be analyzed, which was not possible using traditional techniques.

The comparison(s) can then be performed utilizing the parameters and SQL text identified and mapped above, 140. In one embodiment, a difference is determined between queries for the relevant parameters and a percentage difference can be provided. Using the percentage difference, queries can be considered matches even when there is no exact match (e.g., slight syntactical differences).

The differences are stored in a difference file, 150. One example of the type of information that can be stored in the difference file is provided in FIG. 2, which provides profile difference information 210 and/or SQL text difference information 220. Additional and/or different parameters and/or SQL ext strings can also be included with statistical and analytical information.

Figure 3:
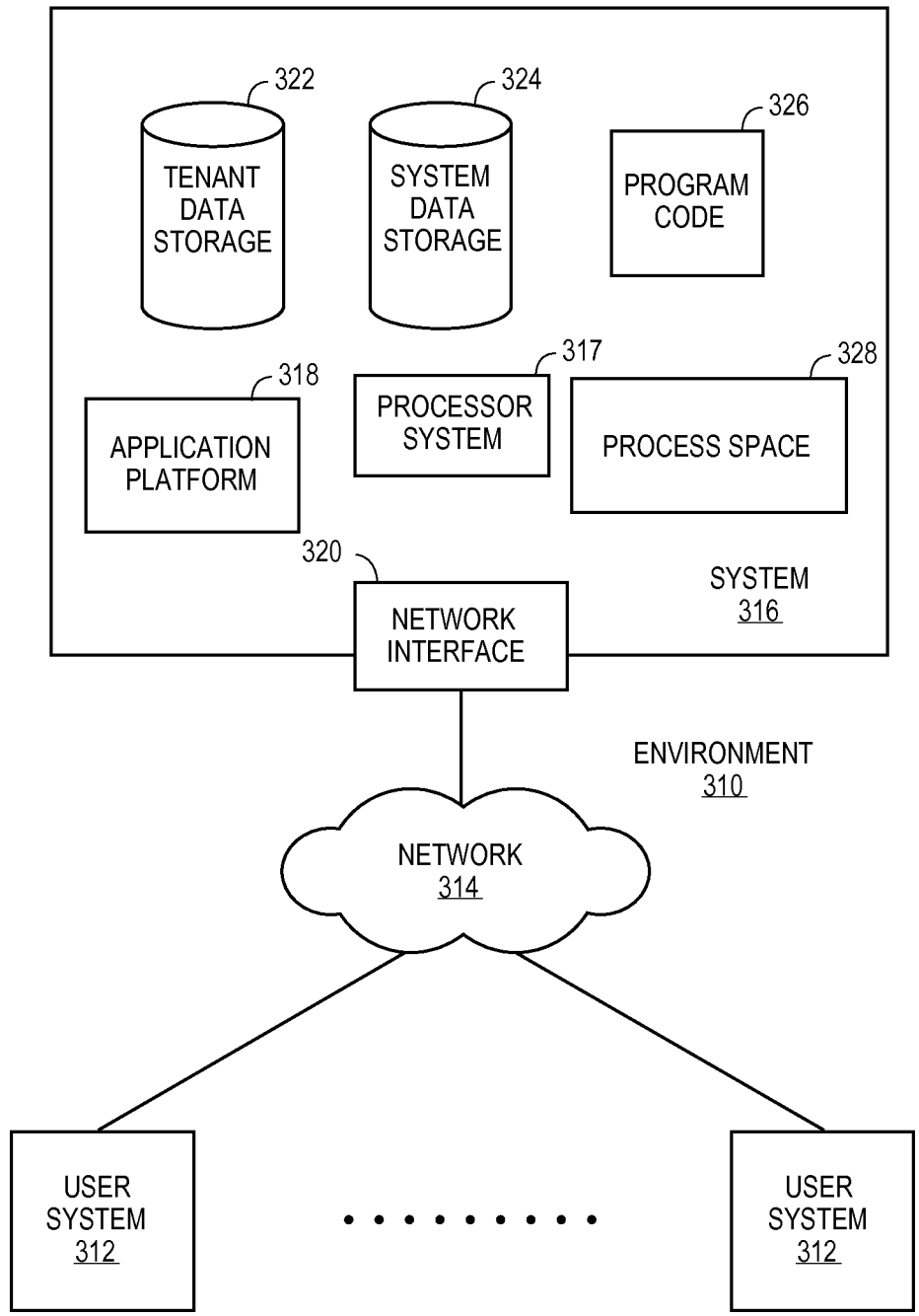
FIG. 3 is a block diagram of one environment wherein an on-demand database service might be used.

FIG. 3 illustrates a block diagram of an environment 310 wherein an on-demand database service might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database service exists. User system 312 may be any machine or system that is used by a user to access a database user system. For example, any of user systems 312 can be a handheld computing device, a mobile phone, a laptop computer, a work station, and/or a network of computing devices. As illustrated in herein FIG. 3 (and in more detail in FIG. 4) user systems 312 might interact via a network 314 with an on-demand database service, which is system 316.

An on-demand database service, such as system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database service 316 may include an application platform 318 that enables creation, managing and executing one or more applications developed by the provider of the on-demand database service, users accessing the on-demand database service via user systems 312, or third party application developers accessing the on-demand database service via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and all of their components might be operator configurable using application(s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
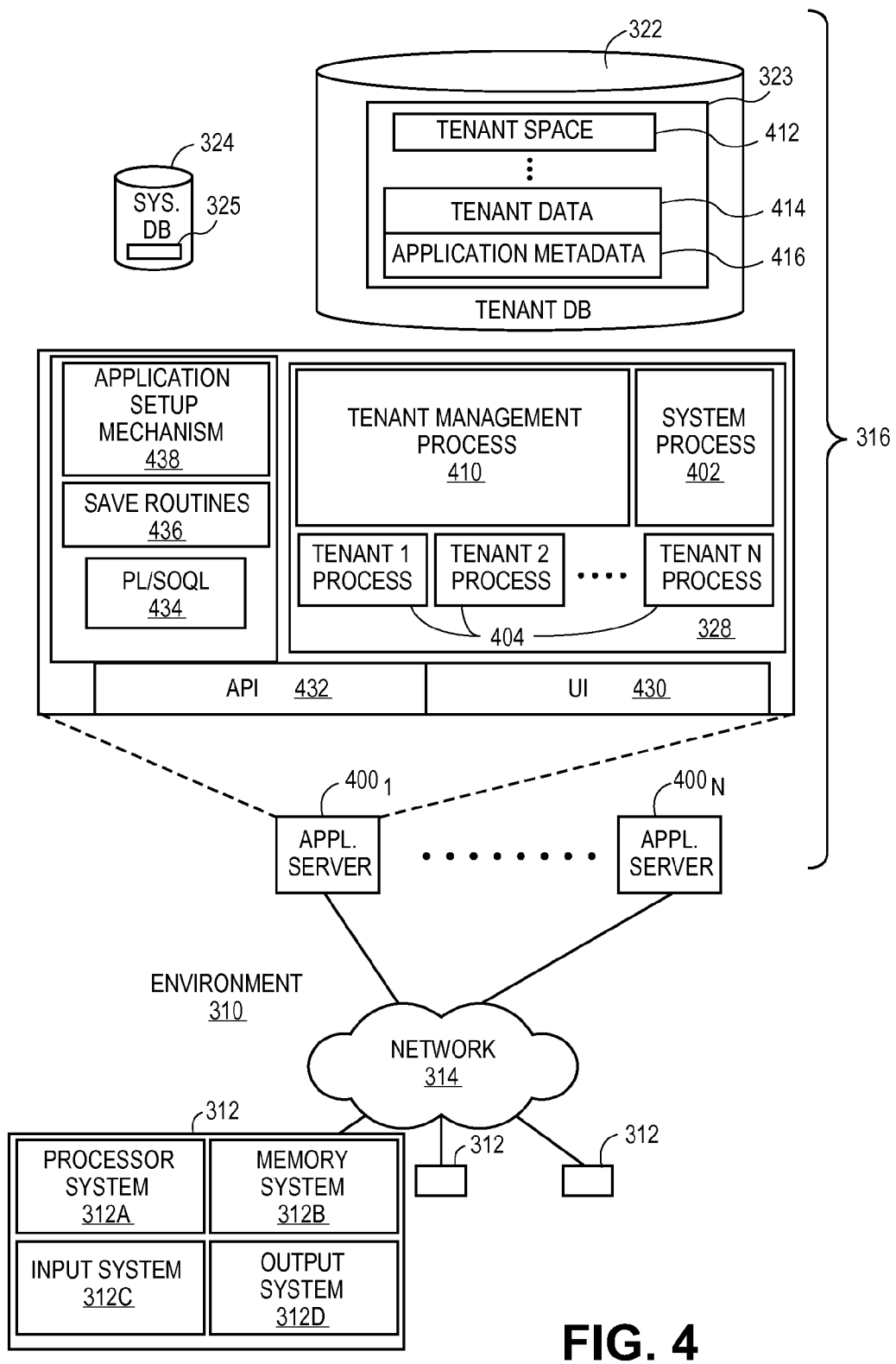
FIG. 4 is a block diagram of one embodiment of elements of environment of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, tenant data 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, tenant data 414 and application metadata 416 might be similarly allocated for each user. For example, a copy of a user's most recently used (MRU) items might be stored to tenant data 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process space 410 for example. Invocations to such applications may be coded using PL/SOQL 434 that provides a programming language style interface extension to API 432. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method of analyzing a plurality of database queries within a database environment, the method comprising:
   determining a first statistical evaluation of a first query plan for a first database query corresponding to a first database having a first database schema with at least one computing device within the database environment;
   determining a second statistical evaluation for a second query plan for a second database query corresponding to a second database having a second database schema with at least one computing device within the database environment;
   comparing the first statistical evaluation and the second statistical evaluation to determine whether the first query plan matches the second query plan with at least one computing device within the database environment;
   storing an indication in a repository of the database environment that the first query matches the second query if the first statistical evaluation matches the second statistical evaluation;
   determining a function that provides the first query plan with at least one computing device within the database environment;
   determining if the second query plan is provided by the function that provides the first query plan with at least one computing device within the database environment;
   evaluating data objects referenced by the first query plan and the second query plan if the function provides both the first query plan and the second query plan with at least one computing device within the database environment to determine if the first query plan and the second query plan are syntactically different versions of equivalent database queries; and
   storing query statistics in the statistical repository of the database environment if the first query plan and the second query plan are syntactically different versions of equivalent database queries.

2. The method of claim 1 further comprising:
   determining a procedure call that provides the first query plan;
   determining if the second query plan is provided by the procedure call that provides the first query plan;
   evaluating data objects referenced by the first query plan and the second query plan if the procedure call provides both the first query plan and the second query plan to determine if the first query plan and the second query plan are syntactically different versions of equivalent database queries.

3. The method of claim 1 wherein the database environment comprises a multitenant database environment to store data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an

11 entity separate from the client entities, and provides on-demand database service to the client entities.

4. The method of claim 1 wherein the first query plan is directed to a first database and the second query plan is directed to a second database.

5. The method of claim 1 wherein the first query plan is directed to a first software version of a database and the second query plan is directed to a second software version of the database.

6. The method of claim 1 wherein the first query plan is directed to a first database having a first schema and the second query plan is directed to a second database having a second schema.

7. The method of claim 1 wherein the first query plan is directed to a first database having a first set of object types and the second query plan is directed to a second database having a second set of object types.

8. A non-transitory computer-readable medium having stored thereon instructions that, when executed by one or more processors, cause the one or more processors to analyze a plurality of database queries within a database environment by:
determining a first statistical evaluation of a first query plan for a first database query corresponding to a first database having a first database schema with at least one computing device within the database environment;
determining a second statistical evaluation for a second query plan for a second database query corresponding to a second database having a second database schema with at least one computing device within the database environment;
comparing the first statistical evaluation and the second statistical evaluation to determine whether the first query plan matches the second query plan with at least one computing device within the database environment;
storing an indication in a repository of the database environment that the first query matches the second query if the first statistical evaluation matches the second statistical evaluation;
determining a function that provides the first query plan with at least one computing device within the database environment;
determining if the second query plan is provided by the function that provides the first query plan with at least one computing device within the database environment;
evaluating data objects referenced by the first query plan and the second query plan if the function provides both the first query plan and the second query plan with at least one computing device within the database environment to determine if the first query plan and the second query plan are syntactically different versions of equivalent database queries; and
storing query statistics in the statistical repository of the database environment if the first query plan and the second query plan are syntactically different versions of equivalent database queries.

9. The non-transitory computer-readable medium of claim 8 further comprising instructions that, when executed by the one or more processors, cause the one or more processors to:
determine a procedure call that provides the first query plan;
determine if the second query plan is provided by the procedure call that provides the first query plan;

12 evaluate data objects referenced by the first query plan and the second query plan if the procedure call provides both the first query plan and the second query plan to determine if the first query plan and the second query plan are syntactically different versions of equivalent database queries.

10. The non-transitory computer-readable medium of claim 8 wherein the database environment comprises a multitenant database environment to store data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

11. The non-transitory computer-readable medium of claim 8 wherein the first query plan is directed to a first database and the second query plan is directed to a second database.

12. The non-transitory computer-readable medium of claim 8 wherein the first query plan is directed to a first software version of a database and the second query plan is directed to a second software version of the database.

13. The non-transitory computer-readable medium of claim 8 wherein the first query plan is directed to a first database having a first schema and the second query plan is directed to a second database having a second schema.

14. The non-transitory computer-readable medium of claim 8 wherein the first query plan is directed to a first database having a first set of object types and the second query plan is directed to a second database having a second set of object types.

15. A database system capable of analyzing a plurality of database queries within a database environment, the database system comprising:
one or more databases;
an intelligent query analysis agent coupled to receive a first statistical evaluation of a first query plan for a first database query corresponding to a first database having a first database schema and a second statistical evaluation for a second query plan for a second database query corresponding to a second database having a second database schema, to compare the first statistical evaluation and the second statistical evaluation to determine whether the first query plan matches the second query plan, to cause to be stored in the one or more databases an indication that the first query matches the second query if the first statistical evaluation matches the second statistical evaluation, to determine a function that provides the first query plan, to determine if the second query plan is provided by the function that provides the first query plan, to evaluate data objects referenced by the first query plan and the second query plan if the function provides both the first query plan and the second query plan to determine if the first query plan and the second query plan are syntactically different versions of equivalent database queries, and to cause to be stored in the database statistics if the first query plan and the second query plan are syntactically different versions of equivalent database queries.

16. The system of claim 15, wherein the intelligent query analysis agent is further configured to determine a procedure call that provides the first query plan, to determine if the second query plan is provided by the procedure call that provides the first query plan, to evaluate data objects referenced by the first query plan and the second query plan if the procedure call provides both the first query plan and the second query plan to determine if the first query plan and the second query plan are syntactically different versions of equivalent database queries.

17. The system of claim 15 wherein the database environment comprises a multitenant database environment to store data for multiple client entities each identified by a tenant identifier (ID) having one of one or more users associated with the tenant ID, wherein users of each of multiple client entities can only access data identified by a tenant ID associated with the respective client entity, and wherein the multitenant database is a hosted database provided by an entity separate from the client entities, and provides on-demand database service to the client entities.

18. The system of claim 15 wherein the first query plan is directed to a first database and the second query plan is directed to a second database.

19. The system of claim 15 wherein the first query plan is directed to a first software version of a database and the second query plan is directed to a second software version of the database.

20. The system of claim 15 wherein the first query plan is directed to a first database having a first schema and the second query plan is directed to a second database having a second schema.

21. The method of claim 15 wherein the first query plan is directed to a first database having a first set of object types and the second query plan is directed to a second database having a second set of object types.

* * * * *